US008876534B1

(12) United States Patent
Frank et al.

(10) Patent No.: US 8,876,534 B1
(45) Date of Patent: Nov. 4, 2014

(54) APPARATUS AND METHODS FOR LIGHTING SYNTHETIC TERRAIN IMAGES

(75) Inventors: David A. Frank, North Liberty, IA (US); Radu E. Denghel, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 2005 days.

(21) Appl. No.: 11/881,011

(22) Filed: Jul. 25, 2007

(51) Int. Cl.
*G09B 9/08* (2006.01)
*G09B 9/30* (2006.01)
*G09B 9/34* (2006.01)
*G09B 9/36* (2006.01)
*G09B 9/38* (2006.01)
*G06T 15/00* (2011.01)
*G06T 15/50* (2011.01)
*G09B 9/32* (2006.01)

(52) U.S. Cl.
CPC *G09B 9/34* (2013.01); *G09B 9/301* (2013.01); *G09B 9/38* (2013.01)
USPC .................. 434/43; 434/30; 434/33; 434/35; 434/38; 434/41; 434/42; 434/44; 345/426; 345/427; 703/6; 703/8

(58) Field of Classification Search
CPC ........ G06T 15/00; G06T 15/50; G06T 15/506
USPC ................. 434/42, 44, 30, 33, 35, 38, 41, 43; 345/426, 427; 703/6, 8
See application file for complete search history.

(56) References Cited

U.S. PATENT DOCUMENTS

| | | | | |
|---|---|---|---|---|
| 3,373,506 A | * | 3/1968 | Davidoff | 434/42 |
| 4,152,766 A | * | 5/1979 | Osofsky et al. | 345/443 |
| 4,179,823 A | * | 12/1979 | Sullivan et al. | 434/43 |
| 4,179,824 A | * | 12/1979 | Marsh | 345/427 |
| 4,181,953 A | * | 1/1980 | Osofsky | 345/443 |
| 4,208,719 A | * | 6/1980 | Lotz et al. | 345/443 |
| 4,213,252 A | * | 7/1980 | Sullivan et al. | 434/43 |
| 4,291,380 A | * | 9/1981 | Rohner | 345/428 |
| 4,348,184 A | * | 9/1982 | Moore | 434/42 |
| 5,137,450 A | * | 8/1992 | Thomas | 434/44 |
| 5,384,719 A | * | 1/1995 | Baker et al. | 434/44 |
| 5,566,073 A | * | 10/1996 | Margolin | 701/454 |
| 5,579,456 A | * | 11/1996 | Cosman | 345/419 |
| 5,798,765 A | * | 8/1998 | Barclay | 345/426 |
| 5,936,552 A | * | 8/1999 | Wichgers et al. | 340/963 |
| 5,995,903 A | * | 11/1999 | Smith et al. | 701/470 |
| 7,123,260 B2 | | 10/2006 | Brust | 345/428 |
| 7,216,069 B2 | * | 5/2007 | Hett | 703/6 |
| 7,848,698 B2 | * | 12/2010 | Batcheller et al. | 434/2 |
| 8,386,100 B1 | * | 2/2013 | Lie | 434/35 |
| 2006/0066459 A1 | | 3/2006 | Burch et al. | 340/980 |
| 2006/0176303 A1 | * | 8/2006 | Fairclough | 345/426 |

* cited by examiner

*Primary Examiner* — Nikolai A Gishnock
(74) *Attorney, Agent, or Firm* — Donna P. Suchy; Daniel M. Barbieri

(57) ABSTRACT

A method for pilot situational awareness comprises calculating a location; providing terrain data for the calculated location; processing the terrain data and positioning a light source generally proximal to a view point of a pilot data to generate a synthetic image, the synthetic image representing an appearance of the terrain data illuminated by an appearance of the light source positioned generally proximal to the view point of the pilot; and displaying the synthetic image.

5 Claims, 7 Drawing Sheets

US 8,876,534 B1

APPARATUS AND METHODS FOR LIGHTING SYNTHETIC TERRAIN IMAGES

FIELD OF THE INVENTION

The present invention generally relates to the field of computer generated displays, and more particularly to a computer generated display of terrain for an aircraft, such as a synthetic vision system.

BACKGROUND

Contemporary aircrafts make extensive use of computer generated displays. Compared to earlier instrumentation, computer generated displays are easier for pilots to use and to understand; an advantage that can prove important when quick decisions must be made. One portion of such a display could be a synthetic view of the ground below and/or in front of the aircraft. Such a view can be generated from raw terrain data such as the commercially available U.S. Geological Survey Digital Elevation Model data or the Defense Mapping Agency's Digital Terrain Elevation data.

SUMMARY

The disclosure is directed to an apparatus and a method for pilot situational awareness and to a method for preventing spatial disorientation of a pilot.

An apparatus for pilot situational awareness comprises a terrain image engine for calculating a location and for providing terrain data for the calculated location; a processor for processing the terrain data and for processing positioning a light source generally proximal to a view point of a pilot data to generate a synthetic image, the synthetic image representing an appearance of the terrain data illuminated by an appearance of the light source positioned generally proximal to the view point of the pilot; and a display for displaying the synthetic image.

A method for pilot situational awareness comprises calculating a location; providing terrain data for the calculated location; processing the terrain data and positioning a light source generally proximal to a view point of a pilot data to generate a synthetic image, the synthetic image representing an appearance of the terrain data illuminated by an appearance of the light source positioned generally proximal to the view point of the pilot; and displaying the synthetic image.

A method for preventing spatial disorientation of a pilot comprises computing an aircraft location and an aircraft attitude; computing a displayable image of a space into which an aircraft is flying based, at least in part, on the calculated aircraft location, the calculated aircraft attitude, and data for positioning a light source generally proximal to a view point of a pilot; displaying the computed image; and illuminating terrain threats in the space into which the aircraft is flying with an appearance of the light source positioned generally proximal to the view point of the pilot in the computed image.

It is to be understood that both the foregoing general description and the following detailed description are exemplary and explanatory only and are not necessarily restrictive of the claims. The accompanying drawings, which are incorporated in and constitute a part of the specification, illustrate examples and together with the general description, serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

A computer generated display utilized by aircraft to display synthetic images of terrain in the cockpit may be a synthetic vision system (SVS). As used herein a "SVS" is any apparatus, system, or method for pilot situational awareness or for the prevention of spatial disorientation of a pilot. The SVS improves aviation safety by providing the pilot with enhanced navigation guidance and situational awareness. The SVS may be a Global Positioning System (GPS) based system that may utilize processors, data storage, graphical and digital signal processing chips, RF circuitry, and bus architectures to display graphical representations of the terrain in front of and/or near the aircraft. The SVS may utilize at least one of location and attitude to display the synthetic images of the terrain. The SVS may utilize multiple images and/or multiple displays. The process of rendering a synthetic image from the terrain data may comprise creating a set of tiles representing terrain elevation data for specific geographic regions and passing the pertinent information from the selected tiles on to a processor to produce a synthetic image.

In developing a SVS, the position of a light source for the displayed synthetic image may be chosen. The light source for lighting the SVS scene or the displayed synthetic image may be positioned generally proximal to a view point of a pilot chosen for viewing the scene.

In calculating the position of the light source data for illuminating the displayed synthetic image, the light source may be calculated as rays of light being emitted from a point at the view point of the pilot to the terrain in a space surrounding the position of the aircraft or may be calculated as rays of light being emitted parallel to the view point of the pilot to the terrain in a space surrounding the position of the aircraft. Typically, the terrain in the space surrounding the position of the aircraft may be the terrain in the space into which the aircraft is flying. However, the field of view may be selected, so the terrain in the space surrounding the position of the aircraft may be the terrain in the space from which the aircraft has flown, below the position of the aircraft, or extended from the wing of the aircraft.

A light source positioned generally proximal to a view point of a pilot allows the closest terrain threats to be visible to the pilot and not obscured by shadows from other features of the terrain scene. Accordingly, positioning the light source generally proximal to a view point of a pilot may illuminate terrain threats in the direct path of the aircraft, and thus, further reduce the frequency of controlled flight into terrain incidents.

Figure 1:
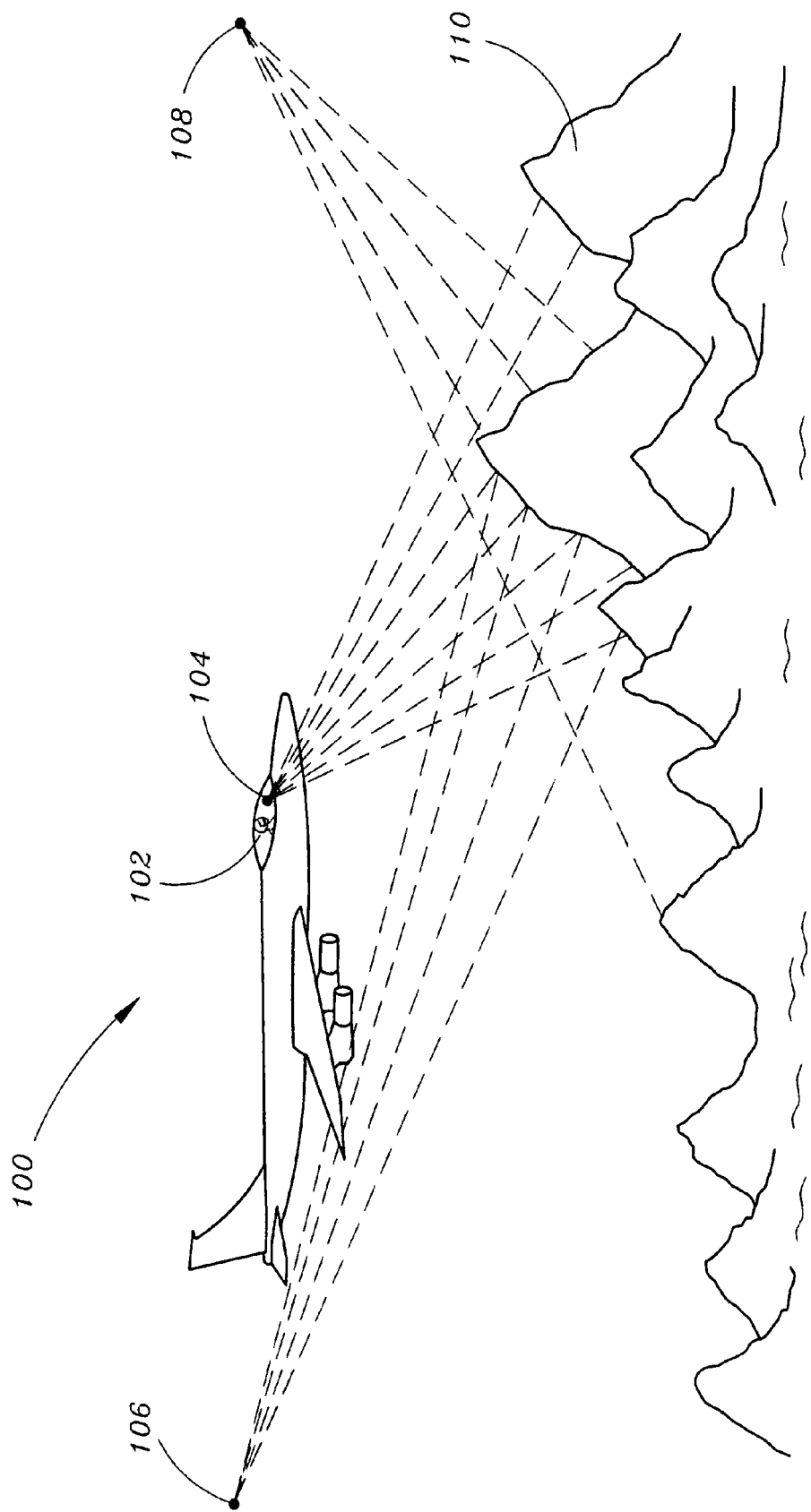
FIG. 1 is a graphical representation of data for different positioned light sources.

Referring to FIG. 1, a graphical representation of data for different positioned light sources 100 is shown. The calculated positions of the light source data may be referenced by the calculated position of a pilot 102. The graphical representation of data for a light source positioned generally proximal to a view point of a pilot, 104, is shown in FIG. 1. The light source may be calculated at other positions. The graphical representation of data for a light source positioned behind and above the view point of a pilot, 106, is shown in FIG. 1. The graphical representation of data for a light source positioned above and in front of the view point of a pilot, 108, is also shown in FIG. 1. As illustrated in FIG. 1, when the light source data is calculated at the view point of the pilot, 104, the appearance of the terrain data 110 is illuminated with fewer shadows or with less areas of the appearance of the terrain data 110 not hit by the calculated rays of light emitted from the positioned light source.

Figure 2:
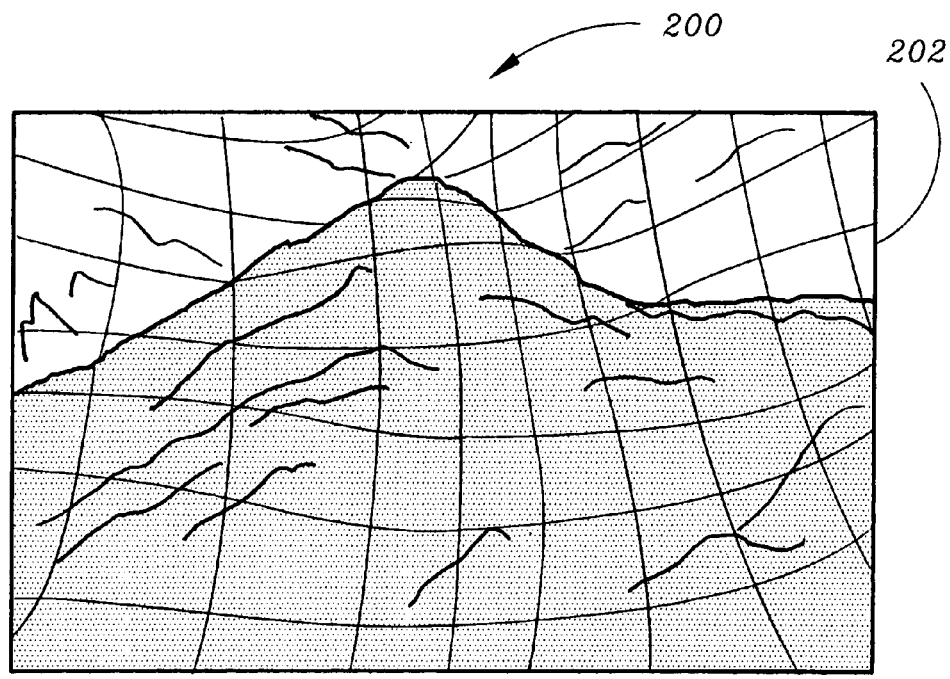
FIG. 2 is an isometric view illustrating a synthetic image of terrain in front of and/or below an aircraft with a light source positioned behind and above a view point of a pilot.
Figure 3:
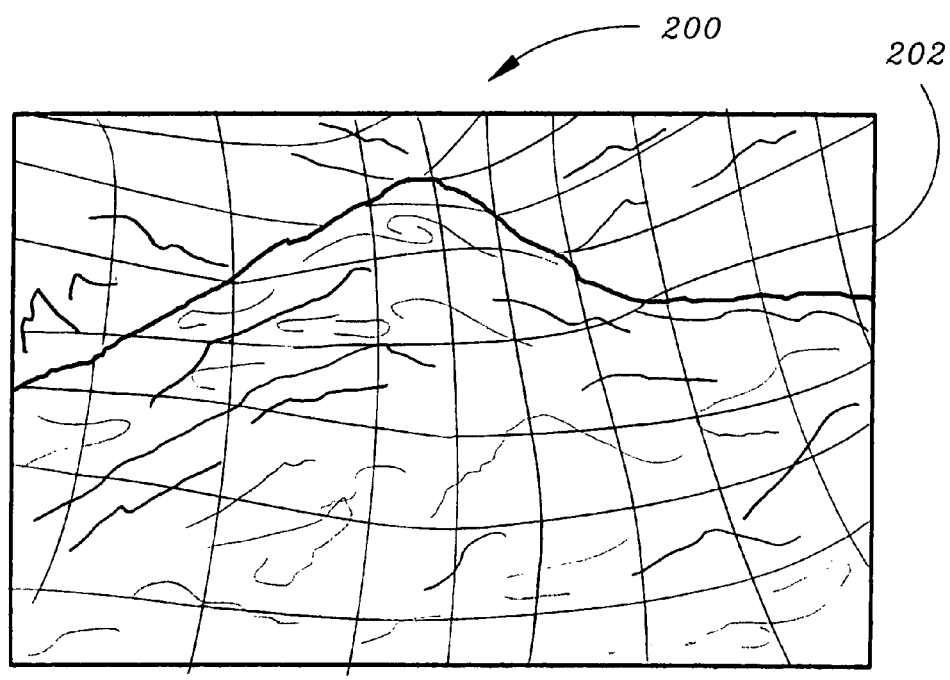
FIG. 3 is an isometric view of a synthetic image of the same terrain as illustrated in FIG. 2 with a light source positioned generally proximal to a view point of a pilot.

Referring now to FIGS. 2 though 5, an isometric view illustrating a synthetic image of terrain 200 and 400 in front and/or below an aircraft utilizing light sources at different positions is shown. The image produced may be adjusted to conform to a selected field of view and to the immediacy of objects of concern. FIG. 2 represents a synthetic image of terrain 200 in front and/or below an aircraft with a light source positioned behind and above the view point of the pilot, while FIG. 3 represents a synthetic image of the same terrain 200 in front and/or below an aircraft with a light source positioned generally proximal to a view point of a pilot. The terrain closest to the aircraft may be more visible in the synthetic image 202 in FIG. 3 with the light source positioned generally proximal to a view point of a pilot than the terrain closest to the aircraft in the synthetic image 202 of FIG. 2 with the light source positioned behind and above the view point of the pilot.

Figure 4:
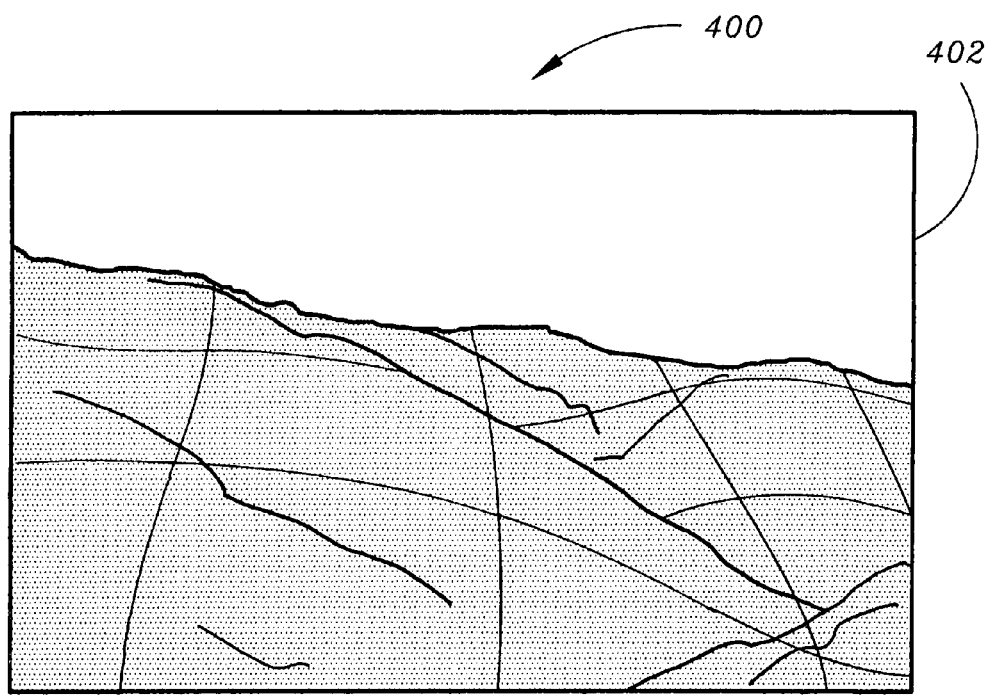
FIG. 4 is an isometric view illustrating a synthetic image of the terrain in front of and/or below an aircraft with a light source positioned in front of and above a view point of a pilot.
Figure 5:
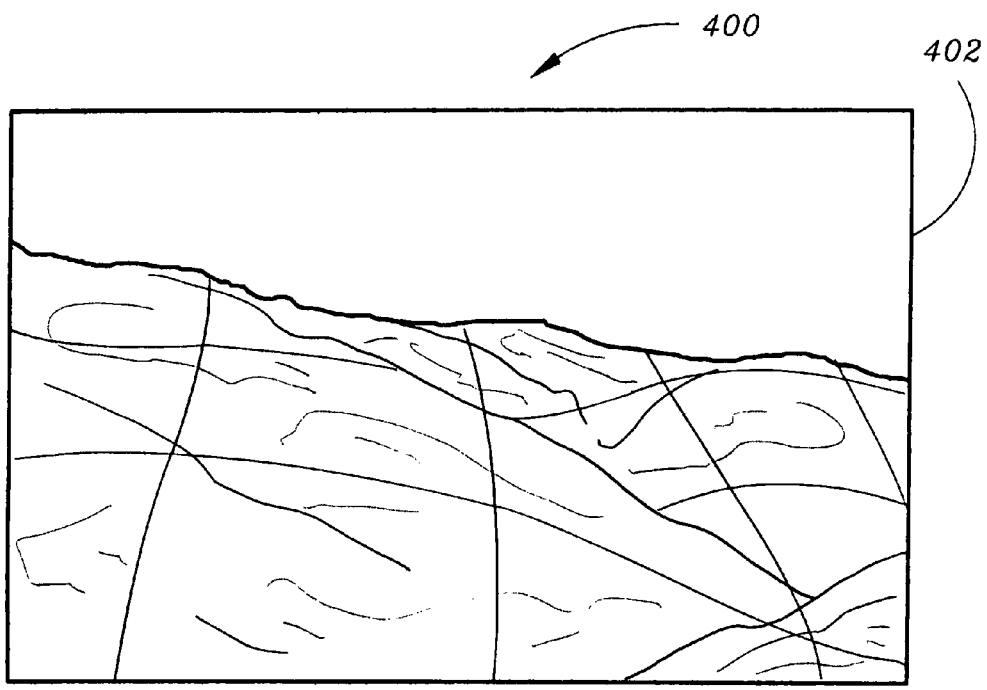
FIG. 5 is an isometric view illustrating a synthetic image of the same terrain as illustrated in FIG. 4 with a light source positioned generally proximal to a view point of a pilot.

FIG. 4 represents a synthetic image of terrain 400 in front and/or below an aircraft with a light source positioned in front of and above the view point of the pilot, while FIG. 5 represents a synthetic image of the same terrain 400 in front and/or below an aircraft with a light source positioned generally proximal to a view point of a pilot. Again the terrain closest to the aircraft may be more visible in the synthetic image 402 of FIG. 5 with the light source positioned generally proximal to a view point of a pilot than the synthetic image of the terrain closest to the aircraft 402 in FIG. 4 with the light source positioned in front of and above the view point of the pilot. It is contemplated that the synthetic terrain image may be of terrain anywhere near the position of the aircraft, such as behind and directly below the position of the aircraft, without departing from the scope and intent of the disclosure.

Figure 6:
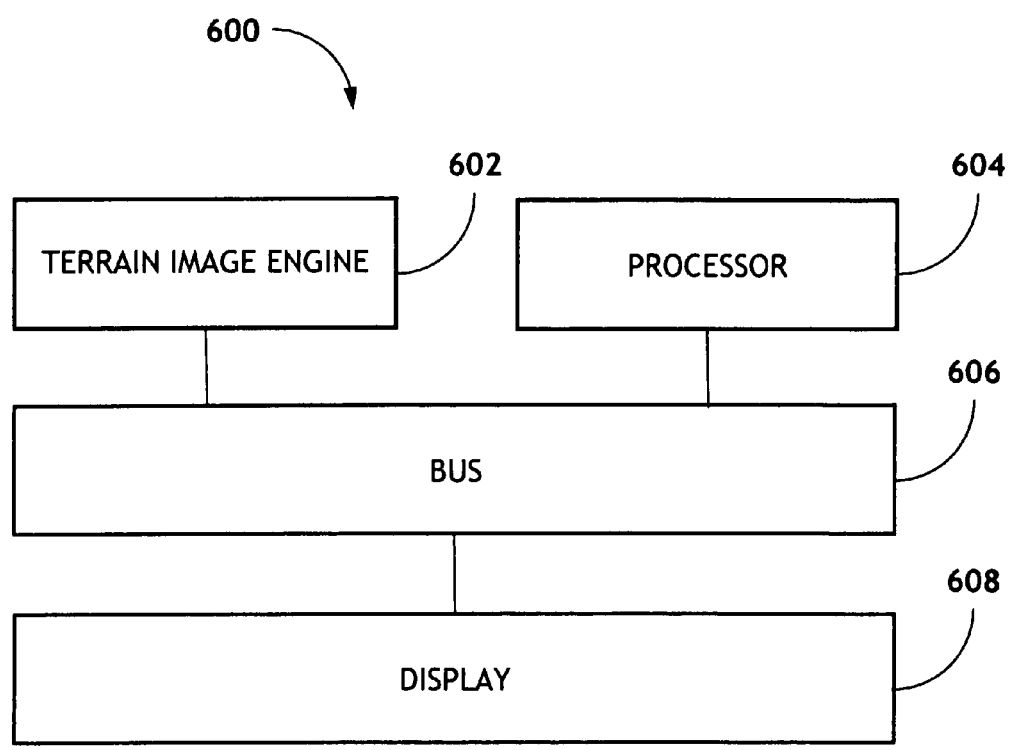
FIG. 6 is a block diagram illustrating an apparatus for pilot situational awareness.

Referring to FIG. 6, a block diagram for an apparatus for pilot situational awareness 600 is illustrated. The apparatus for pilot situational awareness 600 may be a SVS. The apparatus 600 may comprise a terrain image engine 602, a processor 604, a bus 606, and a display 608. The terrain image engine 602 may calculate aircraft location and may provide terrain data based on the calculated aircraft location. The processor 604 may process the terrain data and may process positioning a light source generally proximal to a view point of a pilot data to generate a synthetic image. The synthetic image may represent an appearance of the terrain data illuminated by an appearance of the light source positioned generally proximal to the view point of the pilot. The display 608 may display the synthetic image. The display 608 may be a cathode ray tube, a liquid crystal display screen, a gas plasma-based flat panel display, or other suitable display device. The bus 606 may route information between the terrain image engine 602, processor 604, and/or the display 608. The display 608 may display the synthetic image with the appearance of the light source positioned generally proximal to the view point of the pilot to illuminate terrain threats in a direct path of an aircraft. The terrain image engine 602, the processor 604, and/or the bus 606 may be in a computer (which may be a general purpose computer or a dedicated, specially designed computer).

Figure 7:
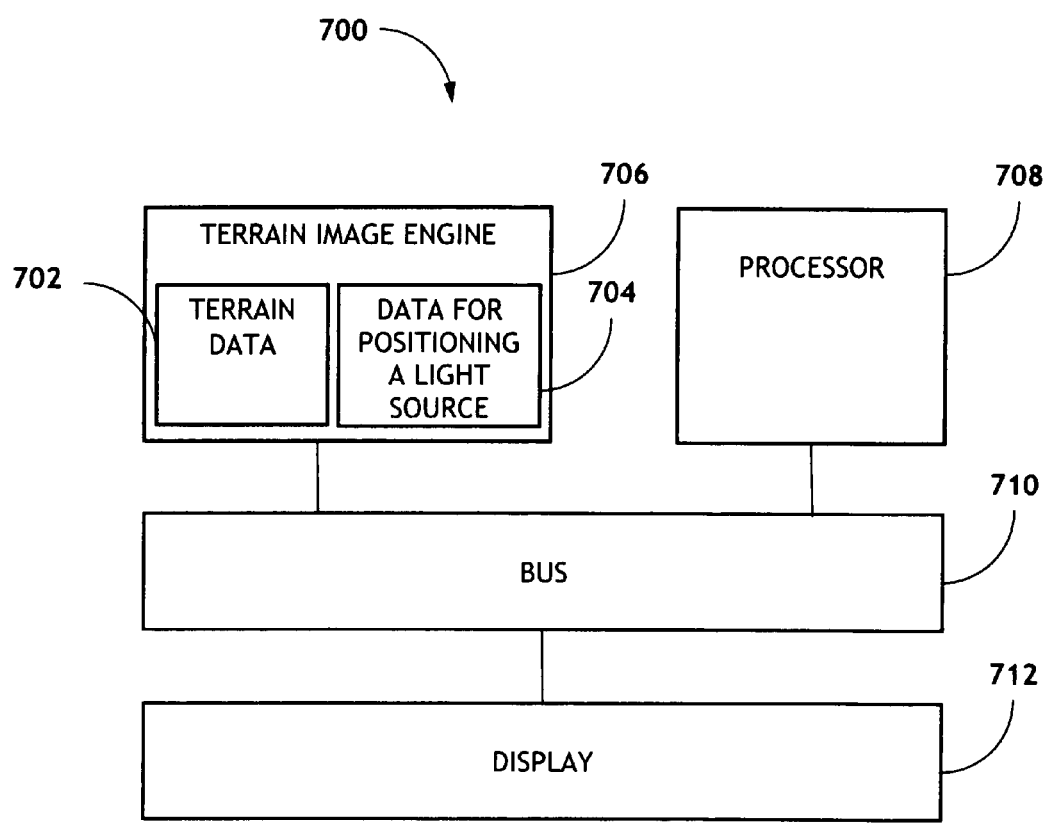
FIG. 7 is a block diagram illustrating a system for pilot situational awareness.

Referring now to FIG. 7, a block diagram for an apparatus for pilot situational awareness 700 is shown. The apparatus 700 may be a SVS. The terrain image engine 706 may calculate aircraft location and provide terrain data 702 based on the calculated aircraft location. The data for positioning a light source generally proximal to a view point of a pilot 704 to illuminate the terrain data 702 may also be provided by the terrain image engine 706. A processor 708 may process the terrain data 702 and may process the data for positioning a light source generally proximal to a view point of a pilot 704 to generate a synthetic image. The synthetic image may represent an appearance of the terrain data illuminated by an appearance of the data for the light source positioned generally proximal to the view point of the pilot. A bus 710 may route information, such as the terrain data 702 and the data for positioning a light source generally proximal to a view point of a pilot 704 to illuminate the terrain data 702, between the terrain image engine 706, the processor 708, and/or a display 712. The display 712 may display the synthetic image. The display 712 may be a cathode ray tube, a liquid crystal display screen, a gas plasma-based flat panel display, or other suitable display device. The display 712 may display the synthetic image with the appearance of the light source positioned generally proximal to the view point of the pilot to illuminate terrain threats in a direct path of an aircraft. The terrain image engine 706, the processor 708, and/or the bus 710 may be in a computer (which may be a general purpose computer or a dedicated, specially designed computer).

Figure 8:
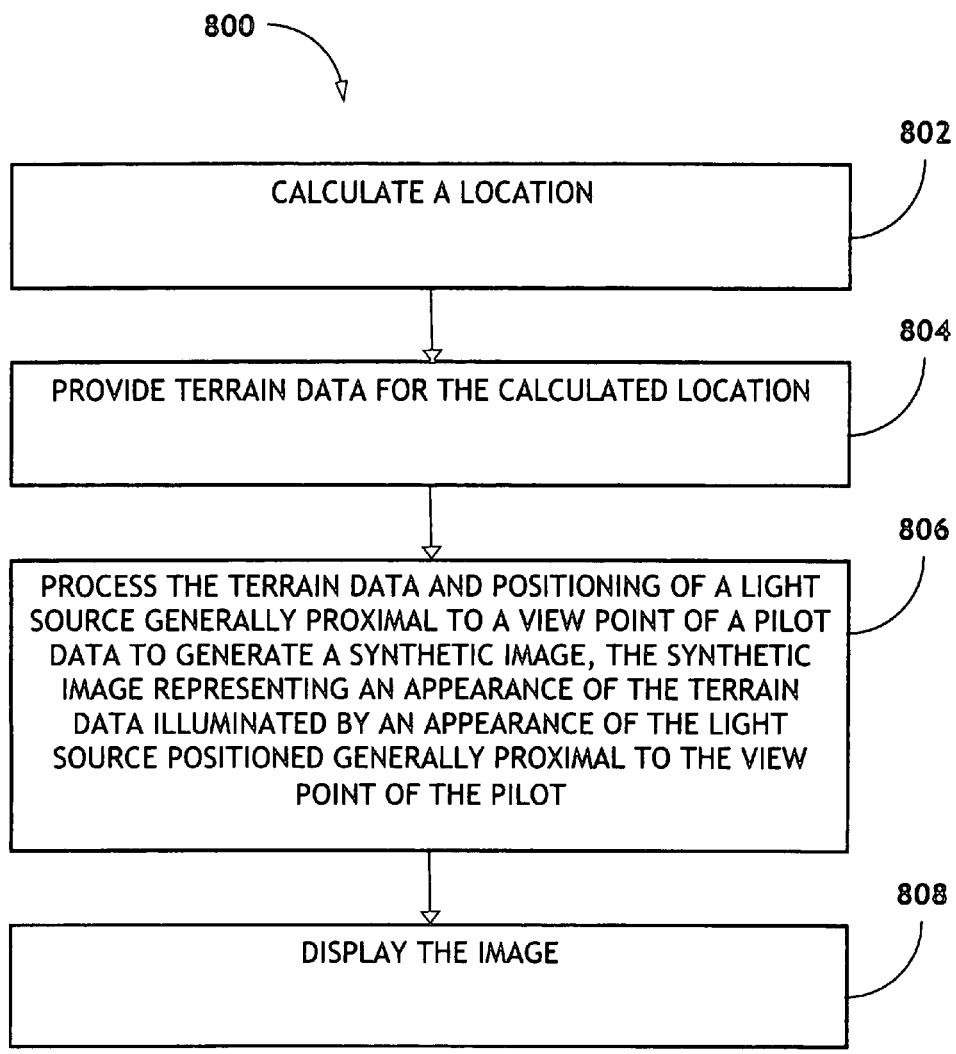
FIG. 8 is a flow diagram illustrating a method for pilot situational awareness.

Referring now to FIG. 8, a flow diagram of a method for pilot situational awareness 800 is shown. Method 800 calculates a location, 802. Method 800 provides terrain data for the calculated location, 804. Method 800 processes the terrain data and positioning a light source generally proximal to a view point of a pilot data to generate a synthetic image, the synthetic image representing an appearance of the terrain data illuminated by an appearance of the light source positioned generally proximal to the view point of the pilot, 806. Method 800 displays the synthetic image, 808. Method 800 may illuminate terrain threats in a direct path of an aircraft through the appearance of the light source positioned generally proximal to the view point of the pilot in the synthetic image.

Figure 9:
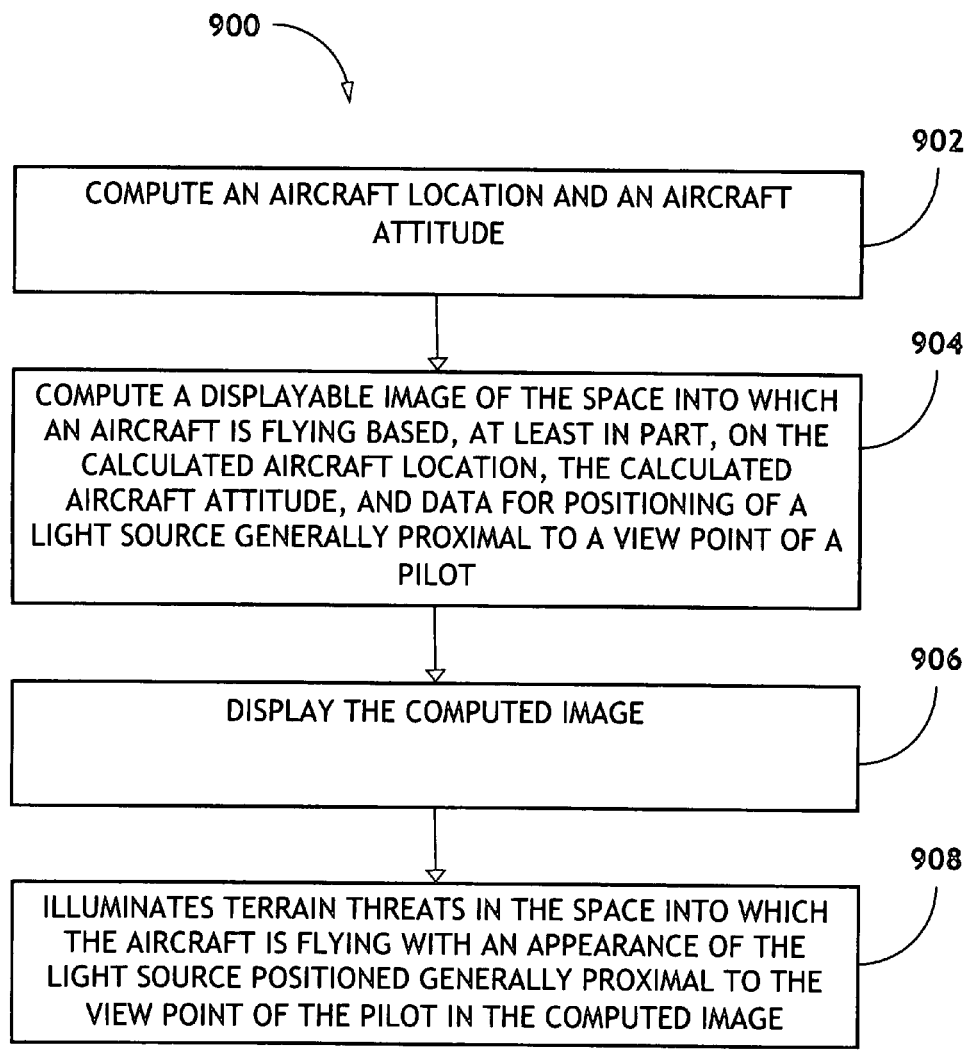
FIG. 9 is a flow diagram illustrating a method for preventing spatial disorientation of a pilot.

Referring now to FIG. 9, a flow diagram of a method for preventing spatial disorientation of a pilot 900 is shown. Method 900 computes an aircraft location and an aircraft attitude, 902. Method 900 computes a displayable image of the space into which an aircraft is flying based, at least in part, on the calculated aircraft location, the calculated aircraft attitude, and data for positioning a light source generally proximal to a view point of a pilot, 904. Method 900 displays the computed image, 906. Method 900 illuminates terrain threats in the space into which the aircraft is flying with an appearance of the light source positioned generally proximal to the view point of the pilot in the computed image, 908.

Methods 800 and 900 may be executed by the apparatuses of FIGS. 6 and 7.

The methods disclosed may be implemented as sets of instructions, through a single production device, and/or through multiple production devices. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the disclosure. The accompanying method claims present elements of the various steps in a sample order, and are not necessarily meant to be limited to the specific order or hierarchy presented.

It is believed that the present invention and many of its attendant advantages will be understood by the foregoing description, and it will be apparent that various changes may be made in the form, construction and arrangement of the components thereof without departing from the scope and spirit of the disclosure or without sacrificing all of its material advantages. The form herein before described being merely an explanatory embodiment thereof, it is the intention of the following claims to encompass and include such changes.

What is claimed is:

1. An apparatus for pilot situational awareness, said apparatus being implemented on-board an aircraft, said apparatus comprising:
    a terrain image engine for calculating a location of the aircraft and for providing terrain data for the calculated location;
    a processor for processing the terrain data and for processing light source data to generate a synthetic image, the synthetic image representing an appearance, as viewed from a view point of a pilot of the aircraft, of the terrain data illuminated by an appearance of a light source of the light source data, the light source positioned generally proximal to the view point of the pilot of the aircraft; and
    a display for displaying the synthetic image,
        wherein the apparatus is a Global Positioning System-based system,
        wherein the apparatus is user-configurable such that at least one of the terrain image engine and the processor provides the light source data by calculating rays of light being emitted from a point generally proximal to the view point of the pilot to a terrain in a user-selected space, the user-selected space being selected from among a plurality of choices presented to the user, said choices including: a space into which the aircraft is flying, a space from which the aircraft has flown, a space below the location of the aircraft, and a space extended from a wing of the aircraft.

2. The apparatus as claimed in claim 1, wherein the display displays the synthetic image with the appearance of the light source positioned generally proximal to the view point of the pilot to illuminate terrain threats in a direct path of the aircraft.

3. A computer program product, comprising:
    a non-transitory computer-readable storage medium including computer-usable program code for performing a method for providing pilot situational awareness via a synthetic vision system implemented on-board an aircraft, said method including:
        calculating a location of the aircraft;
        generating terrain data for the calculated location;
        providing light source data by calculating rays of light being emitted from a point generally proximal to a view point of a pilot to a terrain in a user-selected space, the user-selected space being selected from among a plurality of choices presented to a user, the plurality of choices including: a space into which the aircraft is flying, a space from which the aircraft has flown, a space below the location of the aircraft, and a space extended from a wing of the aircraft;
        processing the terrain data and light source data to generate a synthetic image, the synthetic image representing an appearance, as viewed from the view point of the pilot of the aircraft, of the terrain data illuminated by an appearance of a light source of the light source data, said light source being positioned generally proximal to the view point of the pilot of the aircraft; and
        providing the generated synthetic image to a display of the system,
        wherein the synthetic vision system is a Global Positioning System-based system.

4. The computer program product as claimed in claim 3, said method further comprising illuminating terrain threats in a direct path of the aircraft through the appearance of the light source, said light source being positioned generally proximal to the view point of the pilot in the synthetic image.

5. A computer program product, comprising:
    a non-transitory computer-readable storage medium including computer-usable program code for performing a method for preventing spatial disorientation of a pilot, said method being performed via a computing system implemented on-board an aircraft, said method including:
        computing a location of the aircraft and an aircraft attitude;
        computing a displayable image of terrain, the displayable image having an appearance of being viewed from a view point of the pilot of the aircraft, said terrain being located in a space proximal to the aircraft, the space being selected by a user from among a plurality of choices presented to the user, the plurality of choices including: a space into which the aircraft is flying, a space from which the aircraft has flown, a space below the location of the aircraft, and a space extended from a wing of the aircraft, the displayable image being computed based, at least in part, on the calculated aircraft location and the aircraft attitude, and data for positioning a light source generally proximal to the view point of the pilot;
        illuminating terrain threats in the space into which the aircraft is flying with an appearance of the light source positioned generally proximal to the view point of the pilot in the computed image; and
        providing the computed image to a display of the computing system,
        wherein the computing system is a Global Positioning System-based computing system.

* * * * *